United States Patent
Sakai et al.

(10) Patent No.: US 7,025,452 B2
(45) Date of Patent: Apr. 11, 2006

(54) IMAGE FORMING SYSTEM (75) Inventors: Takaaki Sakai, Hachioji (JP); Masaru Ushio, Hachioji (JP); Junji Sato, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 8 days.

(21) Appl. No.: 10/925,739

(22) Filed: Aug. 25, 2004

(65) Prior Publication Data

US 2005/0105930 A1    May 19, 2005

(30) Foreign Application Priority Data

Nov. 14, 2003 (JP) ............................. 2003-385518
Jul. 14, 2004 (JP) ............................. 2004-207168

(51) Int. Cl.
*B41L 49/02* (2006.01)

(52) U.S. Cl. ................. 347/104; 101/72; 358/1.1; 400/61; 400/76

(58) Field of Classification Search ............... None
See application file for complete search history.

(56) References Cited

U.S. PATENT DOCUMENTS

| 5,669,040 | A | * | 9/1997 | Hisatake | 399/83 |
| 5,923,013 | A | * | 7/1999 | Suzuki et al. | 235/375 |
| 2001/0044868 | A1 | * | 11/2001 | Roztocil et al. | 710/129 |
| 2003/0231320 | A1 | * | 12/2003 | Tsunekawa | 358/1.2 |

FOREIGN PATENT DOCUMENTS

JP    2001-347735 A    12/2001

* cited by examiner

*Primary Examiner*—Andrew H. Hirshfeld
*Assistant Examiner*—Jill E. Culler
(74) *Attorney, Agent, or Firm*—Frishauf, Holtz, Goodman & Chick, P.C.

(57) ABSTRACT

An image forming system, including:
an image forming apparatus and a post processing device, wherein the image forming apparatus includes;
  a printer section,
  a control means,
  a selecting device to select one of a single sided print mode and a double sided print mode,
  and the post processing device includes;
  a sheet supplying tray,
  a conveyance route, and
  a post processing means,
    wherein the control means controls to count the page number to be assigned onto plural sheets of recording media, using a different counting value, based on the selected print mode.

3 Claims, 7 Drawing Sheets

- DOCUMENT -

FIG. 5(b)

- SINGLE SIDED PRINT -

FIG. 5(c)

- DOUBLE SIDED PRINT -

FIG. 6 (a)

PRIOR ART

- DOCUMENT -

FIRST SHEET    SECOND SHEET    THIRD SHEET    FOURTH SHEET

FIG. 6 (b)

PRIOR ART

- SINGLE SIDED PRINT -

FIRST SHEET    SECOND SHEET    THIRD SHEET    FOURTH SHEET

FIG. 6 (c)

PRIOR ART

- DOUBLE SIDED PRINT -

FRONT    BACK    FRONT    BACK

FIRST SHEET      SECOND SHEET

FIG. 7 (a)

PRIOR ART

- SINGLE SIDED PRINT -

| A -1- | B -2- | | C -3- | D -4- |
|---|---|---|---|---|
| FIRST SHEET | SECOND SHEET | THIRD SHEET (INSERTED SHEET) | FOURTH SHEET | FIFTH SHEET |

FIG. 7 (b)

PRIOR ART

- DOUBLE SIDED PRINT -

| A -1- | B -2- | | | C -3- | D -4- |
|---|---|---|---|---|---|
| FRONT | BACK | FRONT | BACK | FRONT | BACK |
| FIRST SHEET | | SECOND SHEET (INSERTED SHEET) | | THIRD SHEET | |

IMAGE FORMING SYSTEM

BACKGROUND OF THE INVENTION

The present invention relates to an image forming system including a printer or a copy machine which forms images on a recording medium such as paper.

In the past, an image forming system including a printer or a copy machine was developed which sequentially printed images on a recording medium (hereinafter referred to as a recording sheet) such as paper or an OHP (over head projector) sheet. Sequential page numbers were printed on each recording sheet.

Figure 6A:
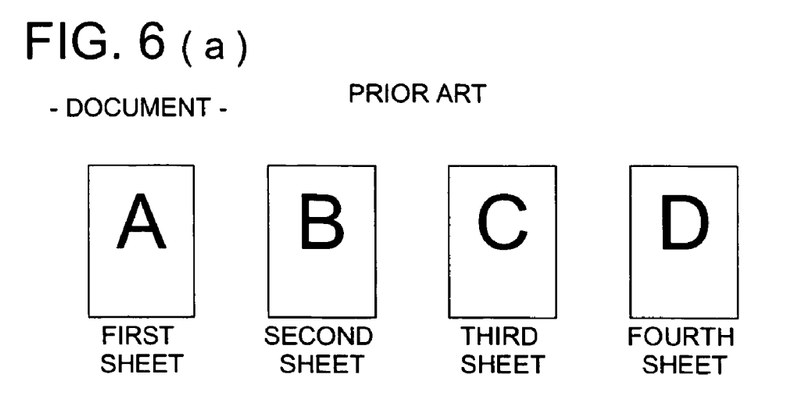
FIG. 6(a) shows four sheets of documents to be copied.
Figure 6B:
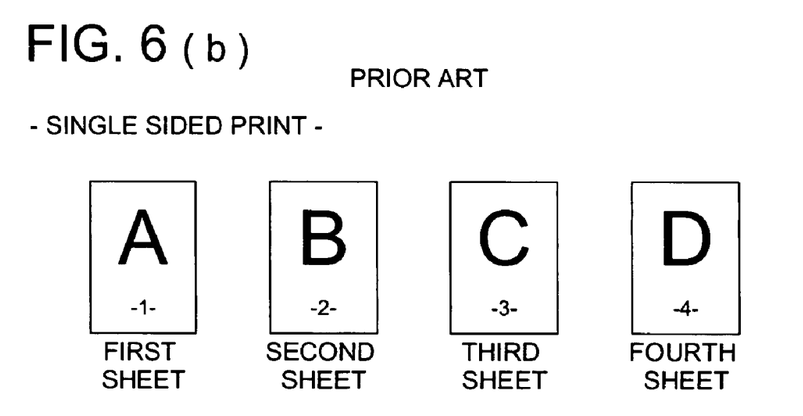
FIG. 6(b) shows an example of an arrangement for sequential page numbers of sheets on which documents have been copied, when the single side printing mode is selected.
Figure 6C:
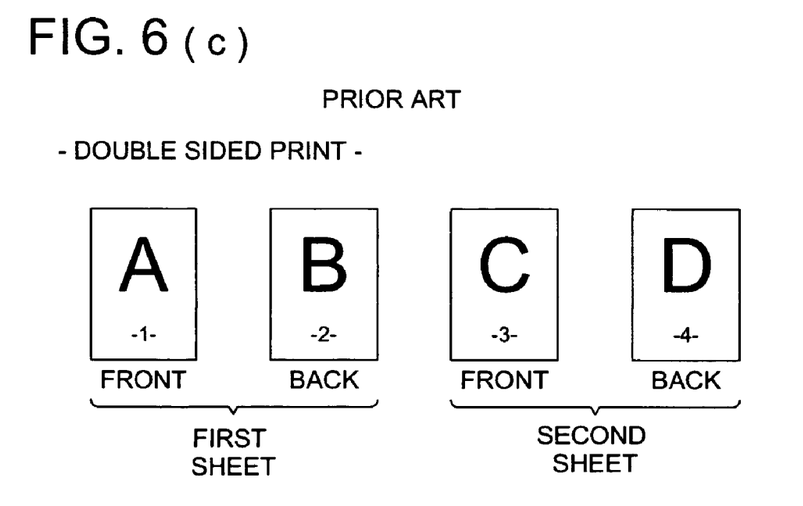
FIG. 6(c) shows an example of an arrangement for sequential page numbers of sheets on which documents have been copied, when the double sides printing mode is selected.

In the case that four sheets of documents shown in FIG. 6(a) are copied, in a single sided print mode as shown in FIG. 6(b), page numbers "-1-" to "-4-" are printed on single sides of four recording sheets, while in a double sided printing mode as shown in FIG. 6(c), sequential page numbers "-1-" to "-4-" are printed on double sides of two recording sheets.

Recently, technology relating to an image forming apparatus which can print not only an image but also the page number is disclosed in Patent Document 1. Further Patent Document 1 discloses the technology relating to an image forming apparatus in which an operator can reserve whether the page number is printed or not.

[Patent Document 1] Japanese Tokkai 2001-347735

However, in the case of counting page numbers in Patent Document 1, an insertion sheet is considered to be a printed sheet same as a recording sheet, and thereby page number counting is conducted not only for recording sheets but also for inserted sheets. That is, a page number is printed on the inserted sheet, or skipped for the inserted sheet, depending upon whether an image, which includes a blank image and its page number, is to be printed on the inserted sheet, and depending upon whether a page number is to be counted for each page.

Further, in the case of double sided printing, when the page number is not printed on the inserted sheet, necessary is a message saying that page numbers are omitted on front and back, which is very cumbersome, and requires a complicated control.

Additionally, in the above control, an inserted sheet which does not pass through the image forming apparatus is usually a sheet on which an image is not printed. Accordingly, when a sheet has not passed through the image forming apparatus, the management and control of an assigned page number have not been conducted, and therefore there is no assigned page numbers for every sheet which has not passed through the image forming apparatus. This results in a problem in that page numbering on every page including the inserted sheets is not controlled.

That is, in an image forming system featuring a function wherein the recording sheets which have not passed through the image forming apparatus are inserted at a predetermined position between plural recording sheets which have passed through the image forming apparatus, it is very problematic to correctly print the sequential page numbers on all the ejected recording sheets, in the ejected order.

Figure 7A:
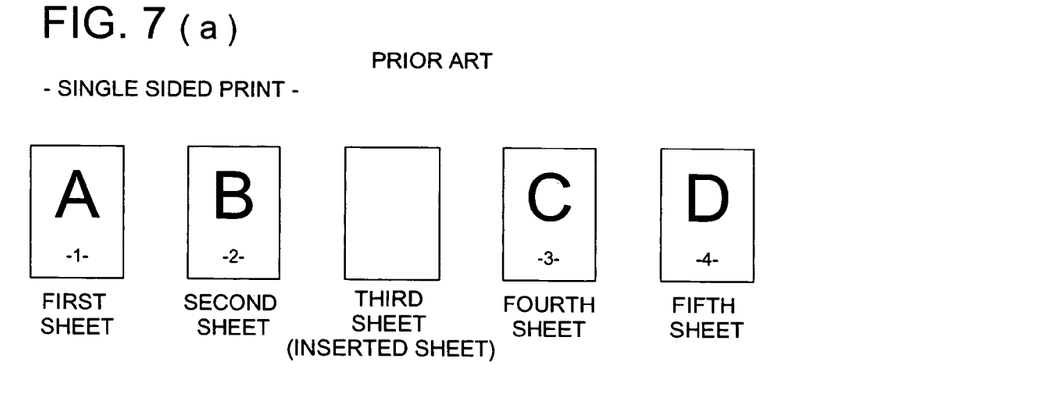
FIG. 7(a) shows an example of an arrangement for sequential page numbers of sheets on which documents have been copied, when the single side printing mode is selected, and an insertion sheet is inserted.
Figure 7B:
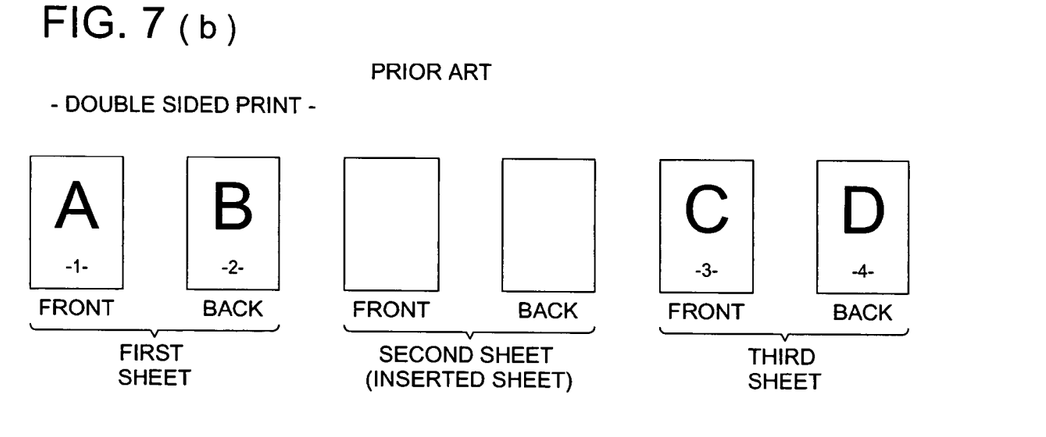
FIG. 7(b) shows an example of the arrangement for sequential page numbers of sheets on which documents have been copied, when the double sides printing mode is selected and an insertion sheet is inserted.

For example, when four sheets of documents shown in FIG. 6(a) are copied by a conventional image forming apparatus, in a single sided print mode, the page number is not printed on the recording sheet inserted in the third order as shown in FIG. 7(a), and further, in a double sided printing mode, the page numbers are not printed on the recording sheet inserted in the second order as shown in FIG. 7(b). Therefore, page numbering not only on the recording sheet but also on the insertion sheet are not controlled, resulting in a problem.

SUMMARY OF THE INVENTION

The objective of the present invention is to print sequential identifying page numbers, based on the single sided print mode or the double sided print mode, in the image forming system including a copying machine and a compound image forming apparatus which prints the image on a recording medium such as paper, while correctly assigning a page number for a single surface or double surfaces of plural recording sheets, as appropriate.

The objective of the present invention can be attained by the structures described below.

Structure 1

In an image forming system including an image forming apparatus and a post processing device, wherein
the image forming apparatus includes;
a printer section which forms an image, while assigning a page number on a single surface or double surfaces of plural recording media fed continuously,
a control means which controls the page number count, in order to assign sequential page numbers on the recording media, and
a selecting device to select one of a single sided print mode, and a double sided print mode, and
the post processing device includes;
a sheet supplying tray for housing the sheets which are to be inserted between a predetermined position of the recording media on which image have been formed,
a conveyance route which conveys the inserted sheets and does not pass them through the image forming apparatus, and
a post processing means for performing post processing steps,
wherein the control means controls to count the page number to be assigned onto continuous and plural sheets of recording media, using a different counting value, based on whether the print mode is for single sided sheets or double sided sheets.

Structure 2

The image forming system described in structure 1, wherein the counting value is set to "1" for the single side print mode, and "2" for the double side print mode.

Structure 3

The image forming system described in structure 1, further including an operation section on which a selection input is performed whether the page number is to be counted or skipped for the insertion sheet, and when the control means counts the page number of the insertion sheet, the control means judges whether the page number of the insertion sheet is to be counted or skipped, based on the selection input, and then the control section counts the page number of the insertion sheet, based on the judged result, which is preferable.

According to the present invention, when the insertion sheets, which have not passed through the image forming apparatus and do not carry the fixed image, are inserted at a predetermined position between the successive and plural recording sheets which have passed through the image forming apparatus and carry the fixed images, it is possible to correctly count and print the sequential page numbers, including the page number of the sheets inserted between the successive and plural recording sheets. Further, it is possible to select whether page numbers for the inserted sheets are to be included or not, and thereby, the system becomes more convenient and functional.

BRIEF DESCRIPTION OF THE DRAWINGS

FIG. 5 explains an arrangement for sequential page numbers, which applies to the present invention.

FIG. 6 shows the arrangement for sequential page numbers of recording sheets in the conventional method.

FIG. 7 shows another arrangement for sequential page numbers of recording sheets in the conventional method.

DETAILED DESCRIPTION OF THE PREFERRED EMBODIMENT

The embodiment of the present invention will be explained below, referring to the drawings.

First of all, the structure of image forming system 1 will be explained, referring to FIG. 1.

Image forming system 1 includes image forming apparatus 10, and post processing device 90 which is post-positioned to image forming apparatus 10.

Image forming apparatus 10 is a compound digital machine, employing:

a copy function which reads out the image data from the original, and forms the image on a recording sheet, such as paper, and a printer function which receives print data from, for example, a personal computer, and forms the image included in the print data on the recording sheet, and then outputs the image, wherein image forming apparatus 10 employs automatic document feeding device 20, reading section 30, and printer section 40.

Automatic document feeding device 20 is called an ADF (automatic document feeder), which feeds individual documents 2, stacked on document mounting tray 21, to a reading area of reading section 30. Further when document 2 is a double-sided document, after one side of document 2 is read out, document 2 is flipped over to have the reverse side read by reading section 30.

Automatic document feeding device 20 includes feeding rollers 22 which feed individual documents 2 stacked on document mounting tray 21 from the top of the stack, contact roller 23 feeds document 2 onto contact glass 31 which is the reading area for documents, and guide rollers 24 guide document 2 fed by feeding rollers 22 along contact roller 23.

Automatic document feeding device 20 further includes changeover claw 25 which changes the feeding direction of document 2 which has passed over contact glass 31, reversing rollers 26 which flip document 2 front to backs and sheet ejecting tray 27 onto which read out document 2 is ejected.

Figure 1:
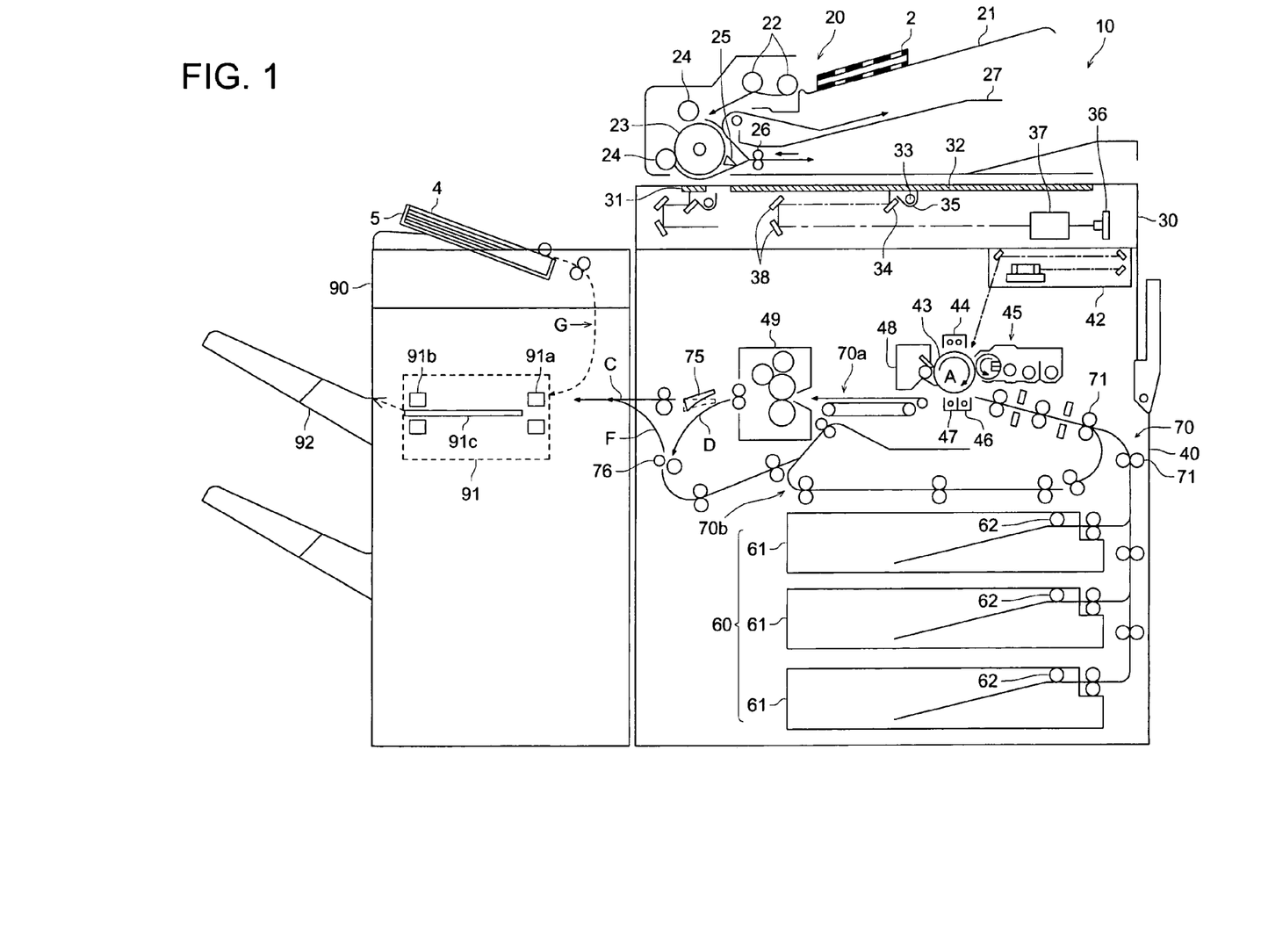
FIG. 1 is a cross section of the image forming system which applies to the present invention.

Reading section 30 reads out the image data of document 2 which has been fed by automatic feeding device 20, and outputs the image data of the above image to main control section 100, not shown in FIG. 1.

Reading section 30 includes exposure scanning section 35 which incorporates light source 33 and mirror 34, line image sensor 36 which receives light reflected from document 2 and outputs electrical signals corresponding to the intensity of the above light, condenser lens 37 which gathers the reflected light from document 2 and directs it to line image sensor 36, and various mirrors 38 which form an optical route to direct the reflected light from mirror 34 of exposure scanning section 35 to light image sensor 36.

When document 2, fed by automatic document feeding device 20 is read out, exposure scanning section 35 moves to the reading area mounted under contact glass 31 and stops there, while document 2 is fed onto exposure scanning section 35 by contact roller 23, where document 2 is read out. When document 2, mounted on platen glass 32 is read out, document 2, which is in a holding state, is read out by exposure scanning section 35 which moves from left to right under platen glass 32.

Printer section 40 forms the image, shown by the image data, onto the recording sheet by an electronic photographic process. Printer section 40 features laser unit 42 which radiates laser rays changing on/off, based on the image data.

Further printer section 40 includes photoconductor 43 on which an electrostatic latent image is formed, and further includes charging device 44, developing device 45, transfer device 46, separating device 47, and cleaning device 48, all of which are arranged around photoconductor 43.

Cylindrical photoconductor 43 is rotated by a driving section, which is not illustrated, in the direction shown by arrow A in FIG. 1. Charging device 44 evenly charges photoconductor 43 by corona discharge.

When the surface of photoconductor 43, which is evenly charged, is scanned by the laser light changing from on to off based on the image data, an electrostatic latent image is formed on the surface of photoconductor 43.

Developing device 45 creates the toner image from the electrostatic latent image formed on the surface of photoconductor 43.

Transfer device 46 impresses photoconductor 43 with an electric field, and thereby the toner images on the surface of photoconductor 43 is transferred onto the recording sheet with electrostatic action. Separating device 47 repels the recording sheet from photoconductor 4 by opposing electrical charges.

Using a blade, cleaning device 48 scrapes away and recovers any remaining toner on photoconductor 43 after transfer. The recovered toner is returned to developing device 45 through a route which is not illustrated. Fixing device 49 presses and heats the toner image on the recording sheet, and thereby the toner image is fixed on the recording sheet.

Sheet feeding section 60 features plural sheet feeding cassettes 61. Various sized and types of sheets are accommodated in plural sheet feeding cassettes 61. First sheet feeding roller 62 feeds individual recording sheets to conveyance section 70 from the top of the stacked sheets accommodated in sheet feeding cassette 61.

Conveyance section 70 includes normal route 70*a* wherein the recording sheet conveyed from sheet feeding cassette 61 passes over the transfer area between photoconductor 43 and transfer device 46, after which the recording sheet passes through fixing device 49 and is ejected to the outside of the apparatus (to which post processing device 90 is connected), and reverse route 70*b* whereby the recording sheet having passed through fixing device 49 is flipped, after which upstream of the transfer area, the recording sheet again follows normal route 70*a*.

When the recording sheet passes through normal route 70*a*, images are formed on one side of the recording sheet, and after the recording sheet is passed through reversing route 70*b*, when the recording sheet again passes through normal route 70*a*, images are also formed on the other side of the recording sheet.

At the downstream with respect to the sheet conveyance direction of fixing device 49, claw 75 which changes the route of recording sheet is positioned. When route change claw is in the horizontal position shown by the dotted line in FIG. 1, the ejecting direction is set straight, and thereby the fixed recording sheet is fed in the direction shown by line C in FIG. 1, and is ejected to post processing device 90. When claw 75 is changed to a sloping position shown in a solid line in FIG. 1, recording sheet is fed in the direction shown by line D in FIG. 1.

After the image formation on the front in the double sided printing operation is conducted, the recording sheet, conveyed in the direction shown by line D, is directly conveyed to reverse route 70*b*, and then the image formation on the back of the sheet is conducted. In single sided printing operation, in a case that the recording sheet after the image formation is reversed and ejected, when the top end of the recording sheet, conveyed in the direction shown by line D, reaches reversing rollers 76 arranged at a branching point, reversing rollers 76 are driven in the reverse direction. Therefore, the recording sheet is conveyed in the direction shown by line F, and is ejected to post processing device 90 in a face down orientation, in which the front and back sides of the sheet are reversed.

Post processing device 90 inserts insertion sheets 4 between the plural recording sheets outputted from image forming apparatus 10, and also inserts insertion sheets 4 before and after the plural recording sheets outputted from image forming apparatus 10, for sorting the chapters or for the cover sheets.

Further, post processing device 90 is provided with post processing means 91, including punching device 91*a* for punching a hole on the inserted sheets, and stapler 91*b* for stapling the recorded sheets, and sheet supplying tray 5 for housing insertion sheet 4

Post processing means 91 stacks the recording sheets or insertion sheets 4 in a stack section 91C in accordance with their conveyed order, and when the required number of sheets are stacked, post processing means 91 conducts stapling or punching based on the inputted instructions, and ejects the produced sheets onto ejection tray 92. Insertion sheets 4 which are stocked on post processing device 90 are conveyed to post processing means 91, via conveyance route G which does not pass through the image forming apparatus.

Figure 2:
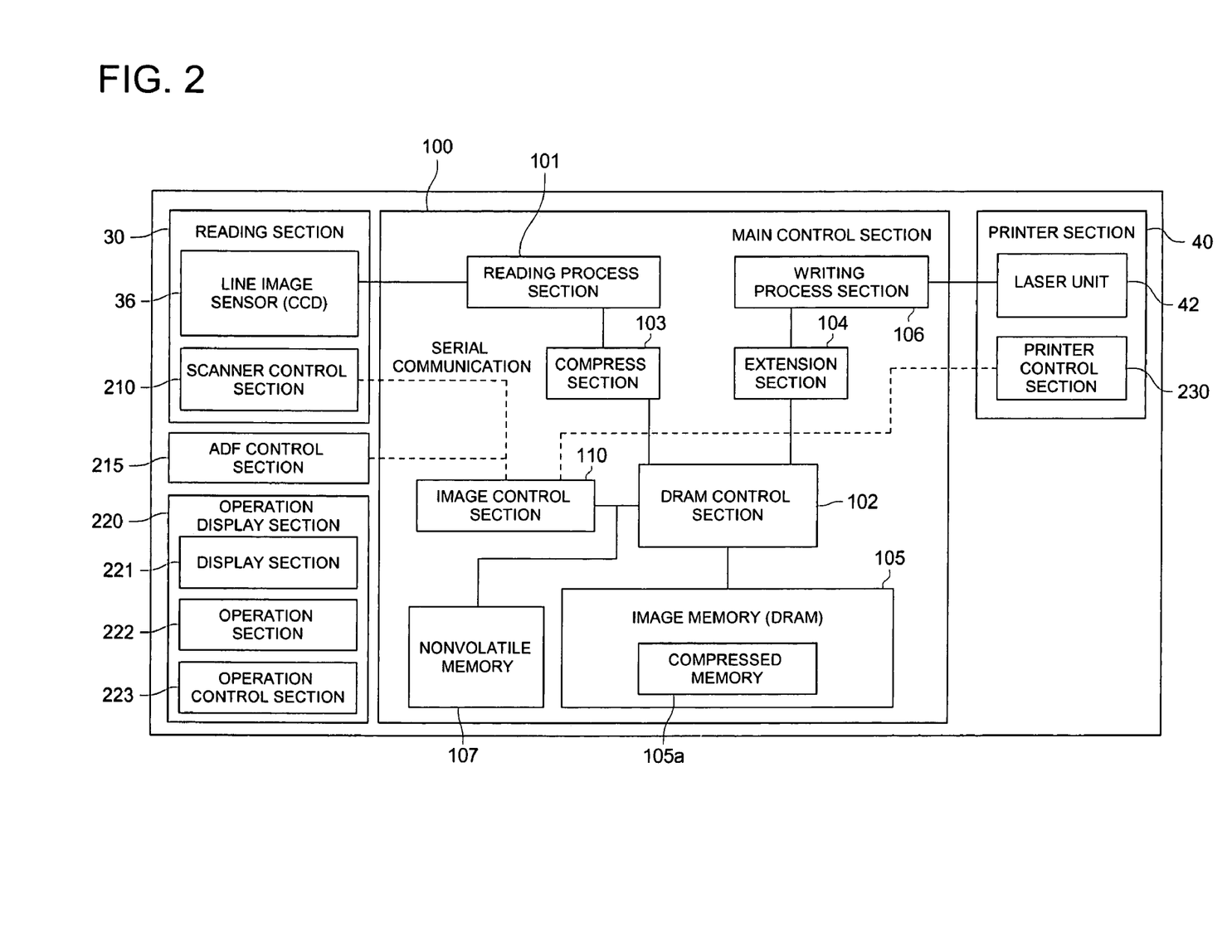
FIG. 2 is a block diagram of the image forming system which applies to the present invention.

Next, the electrical structure of image forming apparatus 10 will be explained while referring to FIG. 2. Reading section 30 is provided with line image sensor 36, and scanner control section 210. Line image sensor 36 is represented by CCD (a charge coupled device), which reads out the image data from document 2 mounted on platen glass 32 via an photoelectric transfer, and outputs it to readout processing section 101 of main control section 100. Scanner control section 210 controls lighting of light source 33, and movement of exposure scanning section 35.

ADF control section 215 controls operations such as automatic document feed which is conducted by automatic document feeding device 20.

Operation display section 220 is provided with display section 221 formed of a liquid crystal display, operation section 222 which is formed of touch sensitive switches and the other types of switches which are arranged on the display, and operation control section 223 which controls the operations of display section 221 and operation section 222, whereby, various operations are input by operation display section 220 and various information is displayed on operation display section 220.

Figure 4:
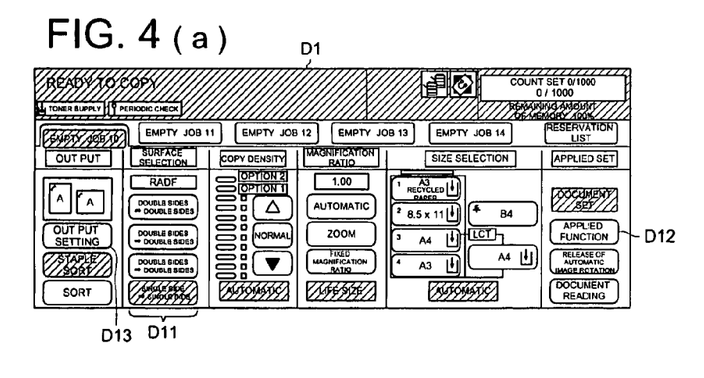
FIG. 4(a) shows an example of the basic operation screen page displayed on a display section shown in FIG. 2.
FIGS. 4(b)–4(e) show examples of the operation screen pages passing from one or plural steps on the basic operation screen.

Operation control section 223 displays various operational displays D1–D5 shown in FIG. 4 on display section 221, to allow input of various operations.

Printer section 40 is provided with laser generator unit 42 and printer control section 230. Printer control section 230 controls charging device 44, transfer section 46, the voltage application to separating device 47, the rotation of photoconductor 43, developing device 45, cleaning device 48, fixing device 49, sheet feeding device 60, transfer section 70, as well as the rotation of a polygon mirror.

Scanner control section 210, ADF control section 215, operation control section 223, and printer control section 230 are provided with CPU (central processing unit), ROM (read only memory), and RAM (random access memory), none of which are illustrated, and perform each control by conducting program stored in each respective ROM.

Main control section 100 is provided with readout processing section 101, DRAM control section 102, compression section 103, expansion section 104, image memory 105, writing section 106, non-volatile memory 107, and image control section 110.

Readout processing section 101 performs an A/D (analog/digital) transfer process, an enlarging process, a mirrored image process, and a binarization process by an error diffusion.

Compression section 103 compresses the binary image data, and expansion section 104 expands the compressed image data to the form of the original image data.

Image memory 105 is provided with compression memory 105a in which the compressed image data are accumulated.

Writing section 106 outputs the image data, which were read out from image memory 105 and expanded, to laser unit 42 in timing with the operation of printer section 40.

DRAM control section 102 performs the timing controls for the read/write and refresh process for image memory 105 being a dynamic RAM, and further performs the timing control for compressing image data and storing the image data in image memory 105, and also for reading out the compressed data from image memory 105 and expanding the compressed data.

Figure 3A:
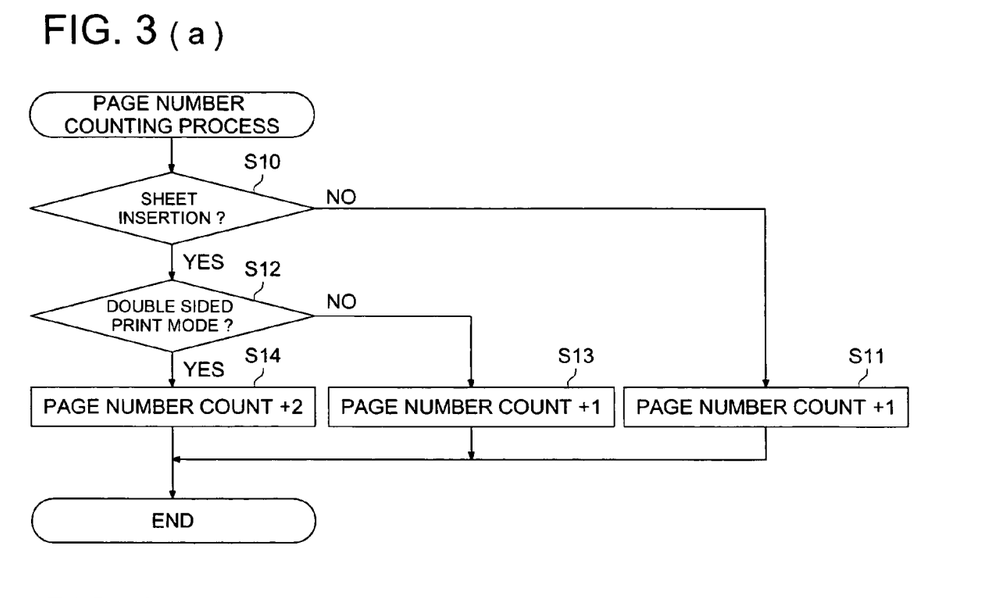
FIG. 3(a) is a flow chart showing the counting process for page numbers which applies the present invention.
Figure 3B:
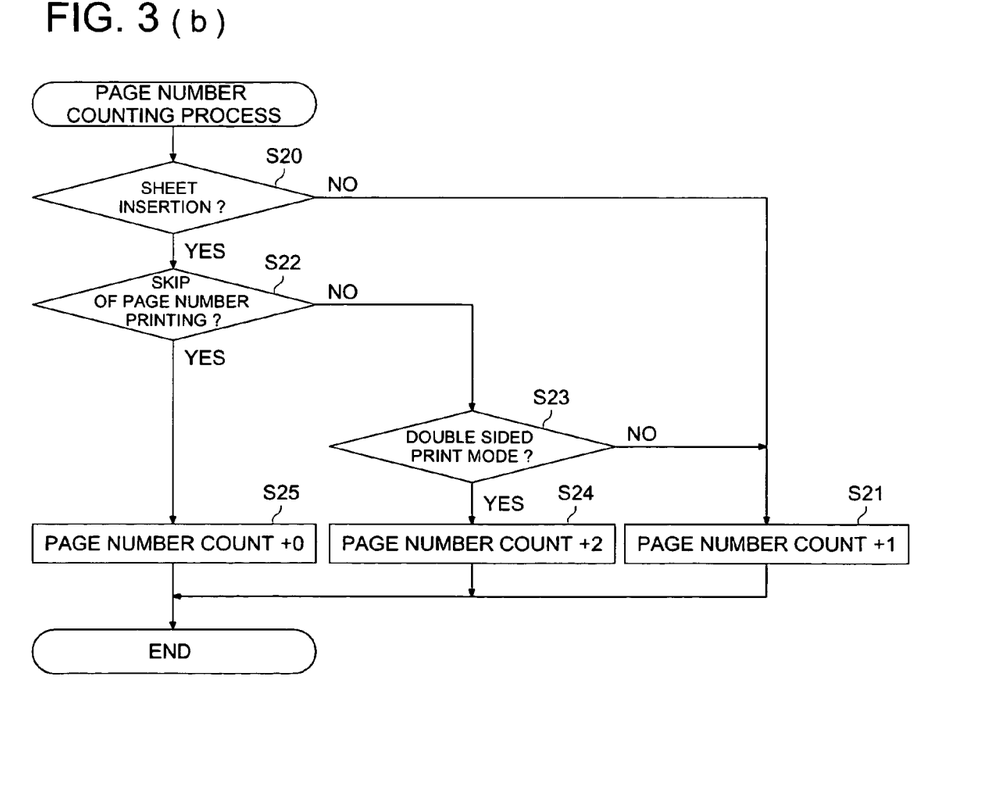
FIG. 3(b) is a flow chart showing another counting process for page numbers.

Image control section 110, which is provided with a CPU, ROM and RAM, controls the overall operation of image forming apparatus 10, in such a way that the CPU performs the program stored in ROM, and thereby controls the flow of image data, and the reservation and the performance of the jobs. Specifically, image control section 110 performs the page number counting process which is shown in the flowchart of FIG. 3(a) or 3(b).

Non-volatile memory 107 stores user data and system data, even when power supply is cut off.

Next, the operation of image forming apparatus 1 will be explained, while referring to FIG. 3. The operation explained below is performed by image control section 110 which is a control means of the present invention.

The page number counting process shown in the flowchart of FIG. 3(a) will be explained below.

The user previously determines the position (for example, a third sheet) where insertion sheet 4 should be inserted among the plural sheets ejected onto sheet ejection tray 92, using operation screen D5, shown in FIG. 4(e). That is, the user previously touches selection button D13 for setting the output of basic operation screen D1 so that operation screen D5 is displayed, then the user previously touches selection button D51 for selecting the sheet insertion on operation screen D5 and inputs insertion instruction of insertion sheet 4, and further, the user previously inputs the desired position (which is a page number) of insertion sheet 4 into input column D52, by using the ten-key pad.

Firstly, the total page number count is selected, depending on whether a recording medium, which will be ejected onto ejection tray 92, is the recording sheet conveyed from image forming apparatus 10, or is insertion sheet 4, directly conveyed from post processing device 90 without passing through image forming apparatus 10 (in step S10). The sequential page numbers are printed only on the recording sheets, not on insertion sheet 4.

At this moment, the total page number count is a datum for counting the page number which is to be printed on the respective recording sheet. The total page number count is stored in an internal memory, which is not illustrated but exists in image control section 110, or is stored in non-volatile memory 107.

In step S10, when the recording medium is the recording sheet and is not insertion sheet 4 (which is "NO" of step S10), the page number to be printed on said recording sheet is equal to ("1"+the present page number count) (step S11).

While in step S10, when the recording medium is insertion sheet 4 (which is "YES" of step S10), it is judged whether double sided printing mode has been selected or not (step S12), and when double sided printing mode has not been selected, that is, when only single sided printing mode has been selected (which is "NO" of step S12), the page number to be printed on the recording sheet is equal to {the value (that is "1") corresponding to the single side page number of said insertion sheet 4+the present page number count} (in step 13).

Figure 5A:
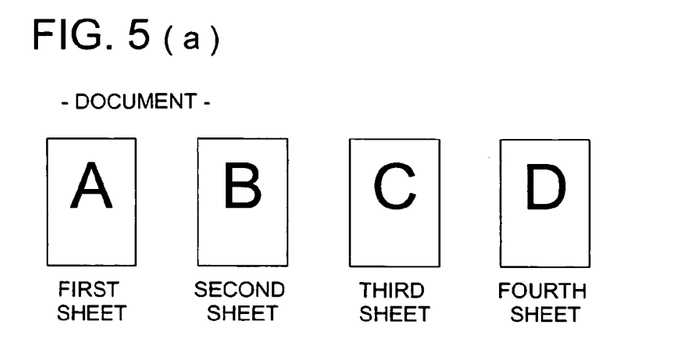
FIG. 5(a) shows four sheets of documents to be copied.
Figure 5B:
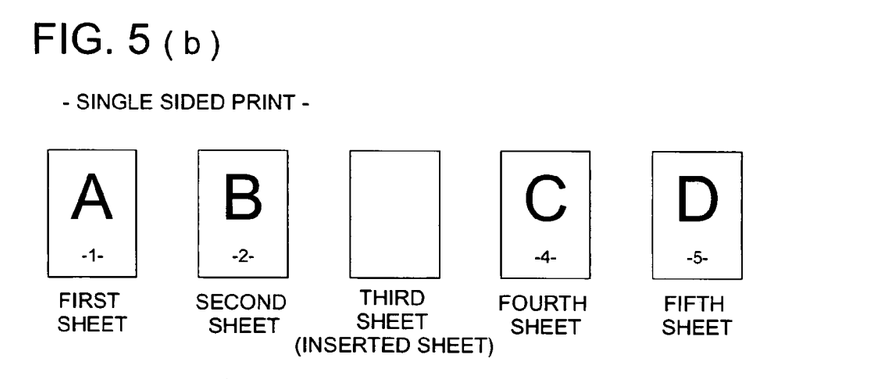
FIG. 5(b) shows an example of the arrangement for the sequential page numbers of sheets on which originals have been copied, when the single side printing mode is selected and an insertion sheet is inserted.

For example, as shown in FIG. 5(b), in the case that four sheets of documents shown in FIG. 5(a) are single side printed, the page number to be printed on the fourth recording sheet (which is the fourth page) which will be ejected after insertion sheet 4 being the third sheet (which is the third page) is "4", because (the page number count "2"+the page number "1" of single sided printing of insertion sheet 4 which is the third sheet+additional "1") is equal to "4".

In this case, the user can select double sided printing mode or single sided printing mode, by touching selection buttons D11 of basic operation screen D1, shown in FIG. 4(a).

In step S12, if the double sided printing mode ("YES" of step S12) is set, the page number to be printed on the recording sheet is equal to {the page number "2" of the double sided print of said insertion sheet 4+the present page number count ("2")} (in step S14).

Figure 5C:
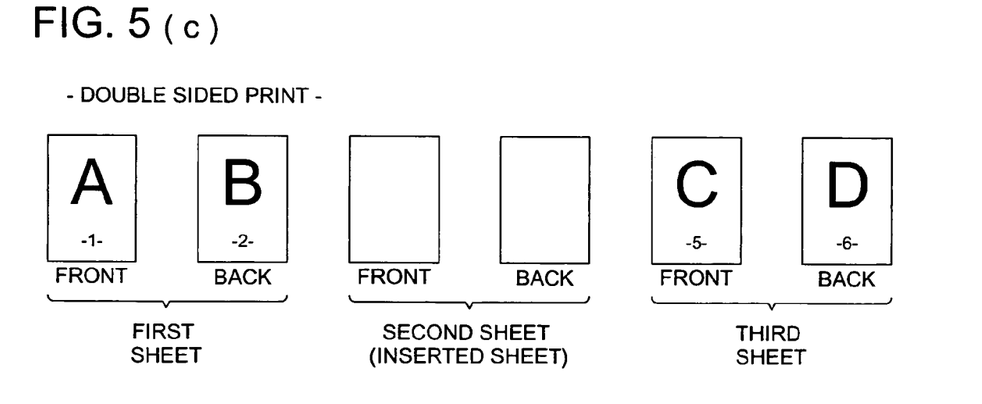
FIG. 5(c) shows an example of the arrangement for sequential page numbers of sheets on which originals have been copied, when the double sides printing mode is selected and an insertion sheet is inserted.

For example, as shown in FIG. 5(c), in the case that four sheets of documents shown in FIG. 5(a) are double side printed, the page number, to be printed on the third recording sheet (which are the fifth page and sixth page) which will be ejected after insertion sheet 4 being the second sheet (which is the third page and the fourth page), is "5". Because {the present page number count "2" (which is for the rear page of the first sheet)+the page number "2" of double sided printing of insertion sheet 4+additional "1"} is equal to "5". Further, the page number to be printed on the rear surface of the third recording sheet is "6", because (the above value "5"+additional "1") is "6".

In this case, image control section 110 will perform the page number counting process shown in the flowchart of FIG. 3(b), instead of the page number counting process shown in FIG. 3(a).

Next the page number counting process shown in the flowchart of FIG. 3(b) will be explained below.

The user can previously determine the position (for example, a third sheet) where insertion sheet 4 should be inserted among the plural sheets ejected on sheet ejection tray 92, using operation screen D5 shown in FIG. 4(e). That is, the user touches selection button D13 of basic operation screen D1 so that operation screen D5 is displayed, then the user touches selection button D51 on operation screen D5 and inputs insertion instruction for insertion sheet 4, and further, the user previously inputs the insertion position (which is a page number) for insertion sheet 4 into input column D52, by using the ten-key pad.

Firstly, the configuration for the page number count is changed, depending on whether the recording medium which will be ejected onto ejection tray 92 is the recording sheet conveyed from image forming apparatus 10, or is insertion sheet 4, which is directly conveyed from post processing device 90 without passing through image forming apparatus 10 (step 20), and further in step S 20, in the case that insertion sheet 4 is ejected onto sheet ejection tray 92 (that is YES of step S20), in step S22, the configuration for the page number count is changed, depending on whether a page number print skip mode is selected or not. The sequential page numbers are printed only on the recording sheet, not on insertion sheet 4.

The user selects the page number print skip mode by the procedure described below. That is, the user touches selection button D12 of basic operation screen D1 to display operation screen D2. Next, the user touches selection button D21 of operation screen D2 to display operation screen D3, after which, the user touches selection button D31 of operation screen D3 to display operation screen D4. Then the user touches "the count step" button from the available buttons D41 so that the selection instruction of the page number print skip mode is sent to image control section 110. In this case, if the user touches "the count" button from the available buttons D41, the page number print skip mode is released, and the page number of insertion sheet 4 is coupled with the total page number count (see step S25 and FIGS. 7(a) and 7(b)).

In step S20, when the recording medium which is given the page number is the recording sheet, and not insertion sheet 4 (No of Step S20), the page number to be printed on the recording sheet is equal to (the present page number+ "1") (in Step S21).

In step S20, when the recording medium is insertion sheet 4 (YES of step S20), and further, in step S22, when the page print skip mode is not selected (NO of step S22), and still further, it is judged whether the double sided printing is selected or not (step S23), and if the double sided printing mode has not been selected, that is, if only single sided printing has been selected (NO of step S23), the page number to be printed on the recording sheet is equal to {the present page number count+the value (that is "1") corresponding to the single side page number of said insertion sheet 4} (shown in Step S21).

In this case, the user can select double side printing mode or single side printing mode, by touching selection buttons D11 of basic operation screen D1 shown in FIG. 4(a).

Further in step S23, the double side printing mode has been established ("YES" of step S23), the page number to be printed on the recording sheet is equal to (the present page number count+the value "2" corresponding to the page number of the double side pages of said insertion sheet 4) (in step S24).

In step S22, when the page number print skip mode has been selected (YES of step S22), the page number is (the present page number count+"0") and the present page number count is still maintained (step S25). Therefore, the page number is counted without including the page number of the insertion sheet.

As explained above, in image forming system 1, including image forming apparatus 10 and post processing device 90, wherein insertion sheet 4 (on which the image is not printed) can be directly inserted to the predetermined position among the plural recording sheets, in post processing device 90, without passing through image forming apparatus 10 (fixing device 49), image forming system 1 can correctly perform arrangement of the page number on the plural recording sheets including insertion sheet 4, depending upon whether the number of insertion sheets is included, and further depending upon whether the single page printing mode or the double sides printing mode is established.

Accordingly, when insertion sheet 4 (which is a sheet having no printed image) is inserted at a predetermined position of the plural recording sheets (which have printed images), through the conveyance route which does not pass through image forming apparatus 10 (fixing device 49), it is thereby possible to print sequential page numbers which includes numbers for the insertion sheets 4, on continuous plural recording sheets. Further it is possible to select whether the number of insertion sheets 4 is included or not, and thereby it becomes very convenient and functional.

The description of the present embodiment shows an example of the image forming system of the present invention, however the invention is not limited to this embodiment. The detailed structure and operation of image forming system 1 of the present embodiments can be appropriately changed within the scope which has no departure from the present invention.

What is claimed is:

1. An image forming system, comprising:
    an image forming apparatus; and
    a post processing device;
    wherein
    the image forming apparatus includes;
        a printer section which forms an image, while assigning a page number on a single surface or double surfaces of plural recording media fed continuously,
        a control means which controls a page number count, in order to assign sequential page numbers on the recording media, and
        a selecting device to select one of a single sided print mode and a double sided print mode, and
    the post processing device includes;
        a sheet supplying tray for housing the sheets which are to be inserted between a predetermined position of the recording media on which images have been formed,
        a conveyance route which conveys the inserted sheets and does not pass them through the image forming apparatus, and
        a post processing means for performing post processing steps,
    wherein the control means controls to count the page number to be assigned onto the plural sheets of recording media fed continuously, using a different counting value, based on whether the print mode is for single sided sheets or double sided sheets.

2. The image forming system in claim 1, wherein the counting value is set to "1" for the single side print mode, and "2" for the double side print mode.

3. The image forming system in structure 1, further comprising an operation section on which a selection input is performed whether the page number is to be counted or skipped for the insertion sheet, and
    when the control means counts the page number of the insertion sheet, the control means judges whether the page number of the insertion sheet is to be counted or skipped, based on the selection input, and then the control section counts the page number of the insertion sheet, based on the judged result.

* * * * *